United States Patent
Lee et al.

(10) Patent No.: US 10,988,644 B2
(45) Date of Patent: Apr. 27, 2021

(54) HYDROCARBON RESIN, METHOD FOR PREPARING HYDROCARBON RESIN, AND ADHESIVE COMPOSITION

(71) Applicant: KOLON INDUSTRIES, INC., Gwacheon-si (KR)

(72) Inventors: Sang Hyun Lee, Yongin-si (KR); Jun Hyo Park, Yongin-si (KR); Joong Suk Lee, Yongin-si (KR); Min Sik Cho, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 38 days.

(21) Appl. No.: 15/741,099

(22) PCT Filed: Dec. 31, 2015

(86) PCT No.: PCT/KR2015/014584
§ 371 (c)(1),
(2) Date: Dec. 29, 2017

(87) PCT Pub. No.: WO2017/003057
PCT Pub. Date: Jan. 5, 2017

(65) Prior Publication Data
US 2018/0187054 A1     Jul. 5, 2018

(30) Foreign Application Priority Data

Jun. 30, 2015 (KR) .......... 10-2015-0093774

(51) Int. Cl.

| | | |
|---|---|---|
| C09J 147/00 | (2006.01) | |
| C08F 8/04 | (2006.01) | |
| C08F 32/00 | (2006.01) | |
| C09J 157/02 | (2006.01) | |
| C09J 123/08 | (2006.01) | |
| C08F 210/14 | (2006.01) | |
| C09J 123/14 | (2006.01) | |
| C08F 240/00 | (2006.01) | |
| C08F 232/08 | (2006.01) | |
| C08L 57/02 | (2006.01) | |
| C08L 45/00 | (2006.01) | |
| C09J 145/00 | (2006.01) | |
| C09J 123/06 | (2006.01) | |
| C09J 123/16 | (2006.01) | |
| C09J 133/06 | (2006.01) | |

(52) U.S. Cl.
CPC .............. *C09J 147/00* (2013.01); *C08F 8/04* (2013.01); *C08F 32/00* (2013.01); *C08F 210/14* (2013.01); *C08F 232/08* (2013.01); *C08F 240/00* (2013.01); *C08L 45/00* (2013.01); *C08L 57/02* (2013.01); *C09J 123/06* (2013.01); *C09J 123/0853* (2013.01); *C09J 123/14* (2013.01); *C09J 123/16* (2013.01); *C09J 133/062* (2013.01); *C09J 145/00* (2013.01); *C09J 157/02* (2013.01)

(58) Field of Classification Search
CPC ...................................................... C08F 232/08
See application file for complete search history.

(56) References Cited

U.S. PATENT DOCUMENTS

| | | | |
|---|---|---|---|
| 4,419,497 | A | 12/1983 | Tsuchiya et al. |
| 5,410,004 | A | 4/1995 | Williams |
| 5,652,308 | A | 7/1997 | Merrill et al. |
| 5,691,432 | A * | 11/1997 | Williams ............... C08F 32/08 526/283 |
| 6,755,963 | B2 | 6/2004 | Haluska et al. |
| 2001/0031847 | A1 | 10/2001 | Macedo et al. |
| 2002/0107332 | A1 | 8/2002 | Klosiewicz et al. |
| 2014/0088277 | A1 | 3/2014 | Stewart et al. |

FOREIGN PATENT DOCUMENTS

| | | |
|---|---|---|
| EP | 0207776 A2 | 1/1987 |
| EP | 0516733 A1 | 12/1992 |
| EP | 1416033 A1 | 5/2004 |
| JP | 05-001292 A | 1/1993 |
| JP | 10-16178 A | 6/1998 |
| JP | 10176178 A | 6/1998 |
| JP | 2000-008067 A | 1/2000 |
| JP | 3812855 B2 | 8/2006 |
| KR | 10-2001-0087846 A | 9/2001 |
| KR | 2013-0111233 A | 10/2013 |
| WO | 2004-056882 A1 | 7/2004 |

OTHER PUBLICATIONS

Park, electronic translation of KR 1020010087846, Jan. 2003.*
Kenji et al., electronic translation of JPH1076178, Jun. 1998.*
Electronic translation of Hayashida (JP 05001292), Jan. 1993.*

* cited by examiner

*Primary Examiner* — Jeffrey C Mullis

(74) *Attorney, Agent, or Firm* — Novick, Kim & Lee, PLLC; Jae Youn Kim

(57) ABSTRACT

Provided are a hydrocarbon resin and a method of preparing the same, wherein thermal polymerization of a diolefin and an olefin is performed, thus obviating a catalyst removal process, material supply problems can be solved, and a hydrogenated hydrocarbon resin can be prepared using a catalyst, which is inexpensive and is easy to handle, thereby realizing a yield and a preparation process that enable real-world application thereof. The hydrogenated hydrocarbon resin prepared by the method of the invention has excellent compatibility and a low specific viscosity, and can thus be efficiently used as a tackifier or an adhesive in a variety of fields.

11 Claims, 9 Drawing Sheets

HYDROCARBON RESIN, METHOD FOR PREPARING HYDROCARBON RESIN, AND ADHESIVE COMPOSITION

TECHNICAL FIELD

The present invention relates to a hydrocarbon resin, a method of preparing the same, and an adhesive.

BACKGROUND ART

A hydrocarbon resin is a representative tackifier, and is mainly used as a material that imparts tackiness or adhesiveness to adhesive tape or products such as paint, ink, rubber, tires, etc. It is a thermoplastic resin in a liquid or solid phase at room temperature and may be provided in various forms ranging from a transparent semi-fluid liquid to a light yellow or water white solid.

A hydrocarbon resin, especially a hydrogenated hydrocarbon resin, is a thermoplastic resin prepared from a high-grade unsaturated hydrocarbon contained in thermal pyrolysis oil such as naphtha or the like in petrochemical plants, and has excellent resistance to heat and ultraviolet (UV) rays and may be adhesive, and may thus be variously utilized in medical supplies, woodworking articles and sanitary articles.

Although the number of products using hydrocarbon resin is increasing every year, the production of a C5 oil fraction, currently useful as the main material for hydrocarbon resin, is decreasing, and the shortage of material for hydrocarbon resin may become severe.

Meanwhile, in the case of a hydrogenated hydrocarbon resin, it is difficult to completely remove unreacted materials, a solvent and a low-molecular-weight oligomer during the preparation thereof, and thus, upon the manufacture of sanitary products such as diapers and the like, which involves spraying an adhesive at a high temperature, the odor of the hydrocarbon resin itself is generated, and may be released when the final product thereof is unpacked. Furthermore, the hydrogenated hydrocarbon resin may generate an offensive odor peculiar thereto when melted at a high temperature, thus adversely affecting working environments. Moreover, when it is applied to sanitary products, limitations are imposed on satisfying the needs of consumers who require the use thereof on sensitive skin, owing to odor-inducing factors.

Accordingly, since the requirement to control the odor of the hydrocarbon resin used for sanitary products is increasing with an increase in the standard of living of consumers, there is an urgent need to develop techniques for reducing the odor of the hydrocarbon resin.

In this regard, U.S. Pat. No. 5,652,308 discloses a tackifier resin in which a C3 monomer, propylene, and dicyclopentadiene (DCPD) obtained from a C5 monomer, are copolymerized using a metallocene catalyst, whereby a portion of the C5 monomer is substituted with the C3 monomer. However, when a hydrocarbon resin is prepared using the above method, an expensive metallocene catalyst, which is very vulnerable to oxygen and water, has to be used, thus causing problems of complicated process designs, high manufacturing costs and a very low yield of less than 30%, making it difficult to achieve real-world application thereof.

Also, the use of a C3 oil fraction, which is in a gas phase, requires an additional process and apparatus for the liquefaction thereof, and additional investment costs related to high-pressure reactors may be incurred, and real-world application thereof becomes difficult unless the high-pressure reactor is provided.

Moreover, Korean Patent Application No. 2013-0111233 discloses a method of preparing a hydrocarbon resin using propylene (C3 oil fraction) as an olefin, but problems such as low yield, poor adhesion performance and strong odor may still occur.

DISCLOSURE

Technical Problem

Accordingly, the present invention is intended to provide a hydrocarbon resin, a method of preparing the same, and an adhesive composition including the same, in which material supply problems pertaining to hydrocarbon resin may be solved, and moreover, a preparation process and yield of the hydrocarbon resin that enable real-world application thereof may be ensured, and furthermore, odor problems may be alleviated.

Technical Solution

Therefore, the present invention provides a method of preparing a hydrocarbon resin, comprising: (S1) preparing a polymer through thermal polymerization of a diolefin and a C6-C20 olefin mixed together in a solvent; and (S2) hydrogenating the polymer of S1 using a hydrogenation catalyst.

Here, the olefin is preferably a C6-C20 olefin, and more preferably a C6-C12 olefin.

In S1, the diolefin may be at least one selected from the group consisting of dicyclopentadiene, piperylene, butadiene and propadiene, and dicyclopentadiene is more preferably used.

In S1, the olefin may be added in an amount of 0.1~2.0 mol relative to 1 mol of the diolefin.

In S1, the thermal polymerization is preferably performed at a temperature of 200~320° C. for 0.5~4 hr.

In S2, the hydrogenation catalyst is preferably at least one selected from the group consisting of nickel, palladium, cobalt, platinum and rhodium catalysts, and may be added in an amount of 0.001~0.5 mol relative to 1 mol of the diolefin. Also, the hydrogenating in S2 is preferably performed at a pressure of 50~150 bar and a temperature of 150~300° C.

In addition, the present invention provides a hydrocarbon resin comprising a repeating unit represented by Chemical Formula 1 below and a repeating unit represented by Chemical Formula 2 below:

<Chemical Formula 1>

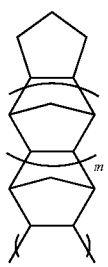

<Chemical Formula 2>

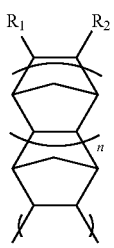

in Chemical Formulas 1 and 2, $R_1$ is hydrogen or a methyl group, $R_2$ is a C3-C18 alkyl group, and m and n are each an integer of 0~10.

The hydrocarbon resin may have a weight average molecular weight of 500~3,000 g/mol, a softening point of 10~150° C., and a color scale (APHA color) of 1~100.

The hydrocarbon resin may include 10~40 mol % of an olefin-derived component.

In addition, the present invention provides an adhesive composition, comprising: the hydrocarbon resin including a repeating unit represented by Chemical Formula 1 and a repeating unit represented by Chemical Formula 2; at least one polymer selected from the group consisting of a styrenic block copolymer, such as a styrene-isoprene block copolymer, a styrene-isoprene-styrene block copolymer, a styrene-butadiene block copolymer and a styrene-butadiene-styrene block copolymer, polyethylene, polypropylene, ethylene vinyl acetate, and an ethylene-based polyolefin block copolymer such as a propylene-ethylene copolymer; and at least one oil selected from the group consisting of synthetic wax, such as paraffin wax and microcrystalline wax, animal natural wax, vegetable natural wax, aromatic oil, naphthenic oil, and paraffinic oil.

An adhesive prepared from the adhesive composition may have a softening point of 50~150° C. and a melt viscosity of 300 cps to 10,000 cps at 160° C. and 200 cps to 8,000 cps at 180° C.

Advantageous Effects

According to the present invention, the method of preparing a hydrocarbon resin is capable of solving material supply problems with conventional hydrocarbon resins by replacing a C3 olefin, serving as a conventional hydrocarbon resin material, with a C6-C20 olefin. Furthermore, a thermal polymerization process is performed in order to carry out a copolymerization reaction of diolefin and olefin, in lieu of a cation catalysis process mainly used upon conventional hydrocarbon resin preparation, thereby greatly increasing a polymerization yield.

In particular, a hydrocarbon resin prepared by the method of the invention is capable of solving unique offensive odor problems with conventional hydrocarbon resins, thereby generating little odor.

Also, the hydrocarbon resin prepared by the method of the invention can exhibit low odor, high adhesion performance, a high softening point, high transparency, a low molecular weight, superior color, and high compatibility with natural rubber or synthetic rubber, and can thus be usefully employed as a tackifier or an adhesive in a variety of fields.

BEST MODE

Figure 1:
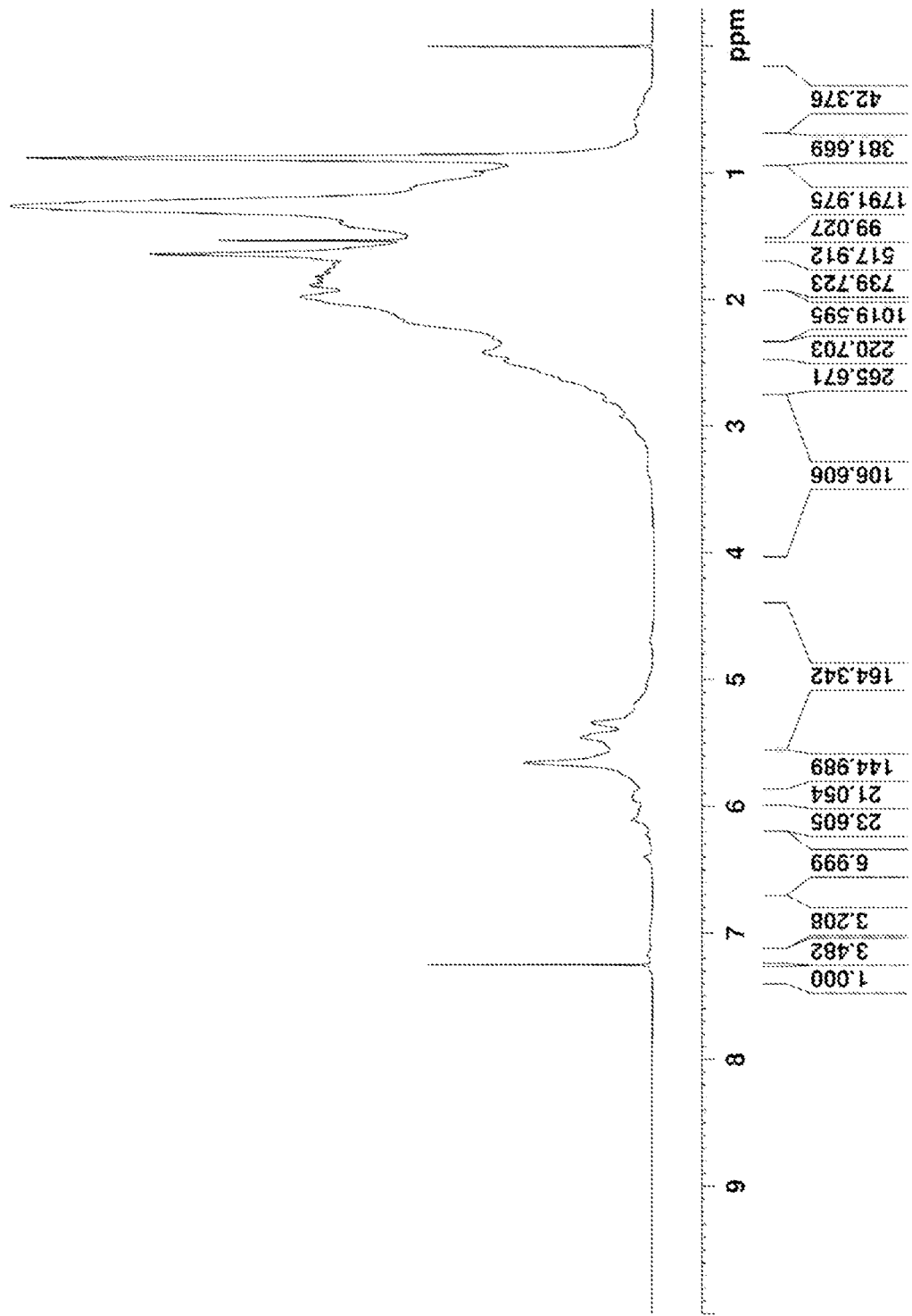
FIG. 1 shows the NMR spectrum of a polymer before hydrogenation in Example 1 according to the present invention.

According to the present invention, a method of preparing a hydrocarbon resin includes (S1) preparing a polymer through thermal polymerization of a diolefin and a C6-C20 olefin mixed together in a solvent and (S2) hydrogenating the polymer of S1 using a hydrogenation catalyst.

In S1 of the present invention, the olefin, particularly a C6-C20 olefin, is thermally polymerized, thereby solving problems in which the supply of a C5 olefin useful as a main material for a conventional hydrocarbon resin is difficult and also solving odor problems with a conventional hydrocarbon resin. Here, the preparation of a hydrocarbon resin through thermal polymerization obviates a catalyst removal process, which is essential to a cation catalysis process upon the conventional preparation of a hydrocarbon resin. In particular, the yield may be greatly increased to 90% or more. Here, the olefin is preferably a C6-C16 olefin, and more preferably a C6-C12 olefin.

In S1, the olefin may have one or at least two double bonds, and preferably one double bond. More preferably, a linear olefin is used.

Specifically, the olefin may include at least one selected from the group consisting of hexene, heptene, octene, nonene, decene and dodecene, and preferably at least one selected from the group consisting of linear α-olefin, such as 1-hexene, 1-heptene, 1-octene, 1-nonene, 1-decene and 1-dodecene. Particularly useful is 1-hexene, 1-octene, 1-decene or 1-dodecene in order to ensure a desired price and supply thereof.

The diolefin may be at least one selected from the group consisting of dicyclopentadiene, piperylene, butadiene and propadiene, and dicyclopentadiene is preferably used in order to realize superior copolymerization with olefin.

The diolefin is dissolved in a solvent before polymerization with the olefin, followed by thermal polymerization with the olefin, resulting in a hydrocarbon resin. Here, the solvent may be used without limitation so long as it is able to dissolve the diolefin. Preferably, toluene, methylene chloride, hexane, xylene, trichlorobenzene, alkyl benzene or the like is used.

The amount of the solvent is not particularly limited so long as it is able to sufficiently dissolve diolefin and olefin, and may be 2~10 mol relative to 1 mol of the diolefin.

The thermal polymerization is carried out at a temperature of 200~320° C. for 0.5~4 hr. If the thermal polymerization is performed under conditions of a temperature less than 200° C. or a time less than 0.5 hr, a low yield may result. On the other hand, if the thermal polymerization is performed under conditions of a temperature exceeding 320° C. or a time exceeding 4 hr, a gel may be formed.

In S2, the hydrogenation catalyst may be selected from the group consisting of nickel, palladium, cobalt, platinum and rhodium metal catalysts. The use of palladium (Pd) is more preferable in order to improve hydrogenation reactivity.

The hydrogenation catalyst is preferably used in an amount of 0.001~0.5 mol relative to 1 mol of the diolefin. If the amount thereof is less than 0.001 mol relative to 1 mol of the diolefin, reactivity may decrease. On the other hand, if the amount thereof exceeds 0.5 mol, economic benefits may be negated due to the use of a large amount of catalyst.

The hydrogenation in S2 may be carried out at a pressure of 50~150 bar and a temperature of 150~300° C. If the reaction is carried out at a pressure exceeding 150 bar or a temperature higher than 300° C., the molecular structure may break down under the harsh reaction conditions. On the other hand, if the reaction pressure or temperature is less than 50 bar or 150° C., respectively, hydrogenation is not sufficiently carried out.

The preparation method according to the present invention enables the preparation of a hydrocarbon resin having a considerably reduced odor at a high yield of 90% or more.

In addition, the present invention addresses a hydrocarbon resin including a repeating unit represented by Chemical Formula 1 below and a repeating unit represented by Chemical Formula 2 below.

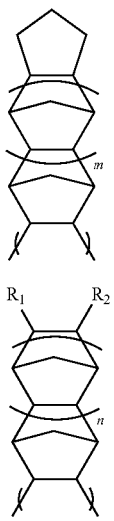

<Chemical Formula 1>

<Chemical Formula 2>

In Chemical Formulas 1 and 2, $R_1$ is hydrogen or a methyl group, $R_2$ is a C3-C18 alkyl group, and m and n are each an integer of 0~10.

The hydrocarbon resin of the present invention is reduced in odor by polymerizing a C6-C20 olefin, which substitutes for a portion of dicyclopentadiene, which has a strong odor, and is configured such that no double bond remains through the hydrogenation of the polymer of C6-C20 olefin and cyclopentadiene, as represented by Chemical Formulas 1 and 2. Furthermore, the hydrocarbon resin of the present invention may increase compatibility with various polymers by copolymerizing the diolefin and the olefin, thus enhancing adhesion and cohesion.

The hydrocarbon resin has a weight average molecular weight of 500~3,000 g/mol, a softening point of 10~150° C., and a color scale (APHA color) of 1~100. If the weight average molecular weight thereof is less than 500 g/mol, adhesion may deteriorate. On the other hand, if the weight average molecular weight thereof exceeds 3000 g/mol, compatibility may decrease. If the softening point thereof is less than 10° C., adhesion may deteriorate. On the other hand, if the softening point thereof is higher than 150° C., it is difficult to perform the preparation process.

If the color scale (APHA color) exceeds 100, a poor color may result, which is considered a defect upon the preparation of an adhesive.

The hydrocarbon resin of the present invention may contain 10~40 mol % of an olefin-derived component. If the amount of the olefin is less than 10 mol %, it is difficult to improve adhesion performance and to reduce the odor thereof through the olefin copolymerization. On the other hand, if the amount thereof exceeds 40 mol %, adhesion performance may deteriorate.

Based on the spectrum results after $^1$H-NMR measurement of the hydrocarbon resin, respective peak area ratios S1 and S2 are 20% or more and 50% or more, as determined by Equations 1 and 2 below.

$$S1 = A1/A3 \qquad \text{<Equation 1>}$$

$$S2 = A2/A3 \qquad \text{<Equation 2>}$$

In Equations 1 and 2, A1 is the peak area of 0.8~1.0 ppm, A2 is the peak area of 1.0~1.4 ppm, and A3 is the peak area of 1.4~7.5 ppm, based on the spectrum results after $^1$H-NMR measurement of the hydrocarbon resin.

The hydrocarbon resin may exhibit improved adhesion performance and reduced odor because of the peak area ratio S1 of 20% or more and the peak area ratio S2 of 50% or more.

The hydrocarbon resin according to the present invention is able to impart tackiness and adhesiveness to a hot-melt adhesive, a pressure-sensitive adhesive, ink, paint, road-marking paint, and the like, and may be blended with various resins, such as natural rubber, synthetic rubber and the like, and may thus be usefully employed as an adhesive or a tackifier.

In addition, the present invention addresses an adhesive composition, comprising: the hydrocarbon resin including a repeating unit represented by Chemical Formula 1 and a repeating unit represented by Chemical Formula 2; at least one polymer selected from the group consisting of a styrenic block copolymer, such as a styrene-isoprene block copolymer, a styrene-isoprene-styrene block copolymer, a styrene-butadiene block copolymer and a styrene-butadiene-styrene block copolymer, polyethylene, polypropylene, ethylene vinyl acetate, and an ethylene-based polyolefin block copolymer such as a propylene-ethylene copolymer; and at least one oil selected from the group consisting of synthetic wax, such as paraffin wax and microcrystalline wax, animal natural wax, vegetable natural wax, aromatic oil, naphthenic oil, and paraffinic oil.

An adhesive prepared from the adhesive composition has a softening point of 50 to 150° C. and a melt viscosity of 300 cps to 10,000 cps at 160° C. and 200 cps to 8,000 cps at 180° C.

If the softening point of the adhesive is less than 50° C., adhesion may deteriorate. On the other hand, if the softening point thereof exceeds 150° C., it is difficult to perform the preparation process, which is undesirable.

If the melt viscosity thereof exceeds 10,000 cps at 160° C., processability may deteriorate. On the other hand, if the melt viscosity thereof is less than 300 cps, adhesion may deteriorate. If the melt viscosity thereof exceeds 8,000 cps at 180° C., processability may deteriorate. On the other hand, if the melt viscosity thereof is less than 200 cps, adhesion may deteriorate.

The adhesive made of the adhesive composition may be used as a hot-melt adhesive (HMA) or a hot-melt pressure-sensitive adhesive (HMPSA).

The adhesive of the invention may exhibit superior properties for use as a hot-melt adhesive, such as compatibility of 100° C. or less, hardness of 30 to 90, an open time of 5 sec to less than 30 sec, and a set time of 0.1 sec to less than 5 sec.

The adhesive of the invention may exhibit superior properties for use as a hot-melt pressure-sensitive adhesive, such as 40 cm or less at the initial stage and 40 cm or less after aging in a ball tack method, 500 gf/in or more at the initial stage and 500 gf/in or more after aging in a peel strength method, 30 min or more at the initial stage and 30 min or more after aging in a holding power method, and 40° C. or more at the initial stage and 40° C. or more after aging in a SAFT method.

MODE FOR INVENTION

A better understanding of the present invention may be obtained through the following examples, which are set forth to illustrate, but are not to be construed as limiting the scope of the present invention.

EXAMPLES

Example 1

In a 1 L autoclave, 1.5 mol of dicyclopentadiene (DCPD) was dissolved in 4 mol of a toluene solvent, thus preparing a mixture. 0.5 mol of 1-hexene was then added thereto, and the reactor was closed, after which the reaction temperature was maintained at 270° C. and thermal polymerization was carried out for 2 hr and was then terminated. After completion of the reaction, the produced polymer was distilled at 240° C. for 5 min to recover unreacted oil fractions, thus obtaining 55 g of the remaining polymer. The 55 g of the polymer thus obtained was added with a hydrogenation solvent, toluene, in an amount 1.5 times the amount thereof and thus completely dissolved, and was then placed in a 1 L autoclave. Thereafter, 0.2 mol of a palladium catalyst was added thereto, and the reactor was closed, after which a hydrogenation reaction was carried out at a hydrogen pressure of 80 bar and a temperature of 230° C. for 90 min. After termination of the reaction, the produced reaction liquid was distilled in a vacuum of 10 torr at 260° C. for 10 min, thereby yielding 50 g of a hydrogenated hydrocarbon resin. The kinds and amounts of individual components thereof are given in Table 1 below.

Whether the polymer before hydrogenation and the hydrocarbon resin after hydrogenation were polymerized was determined using an NMR spectrometer (500 NMR made by Bruker, 14.1 tesla). The results are shows in FIGS. 1 and 2. Based on the $^1$H-NMR spectrum measurement results of FIG. 1, the structure of the polymer before hydrogenation showed that the peak representing a methyl group ($-CH_3$) derived from 1-hexene of 0.85~0.95 ppm was increased, and simultaneously that the peak representing the <—$CH_2$—> chain of 1-hexene of 1.20~1.30 ppm was increased, from which the copolymerization of DCPD and 1-hexene was confirmed.

Figure 2:
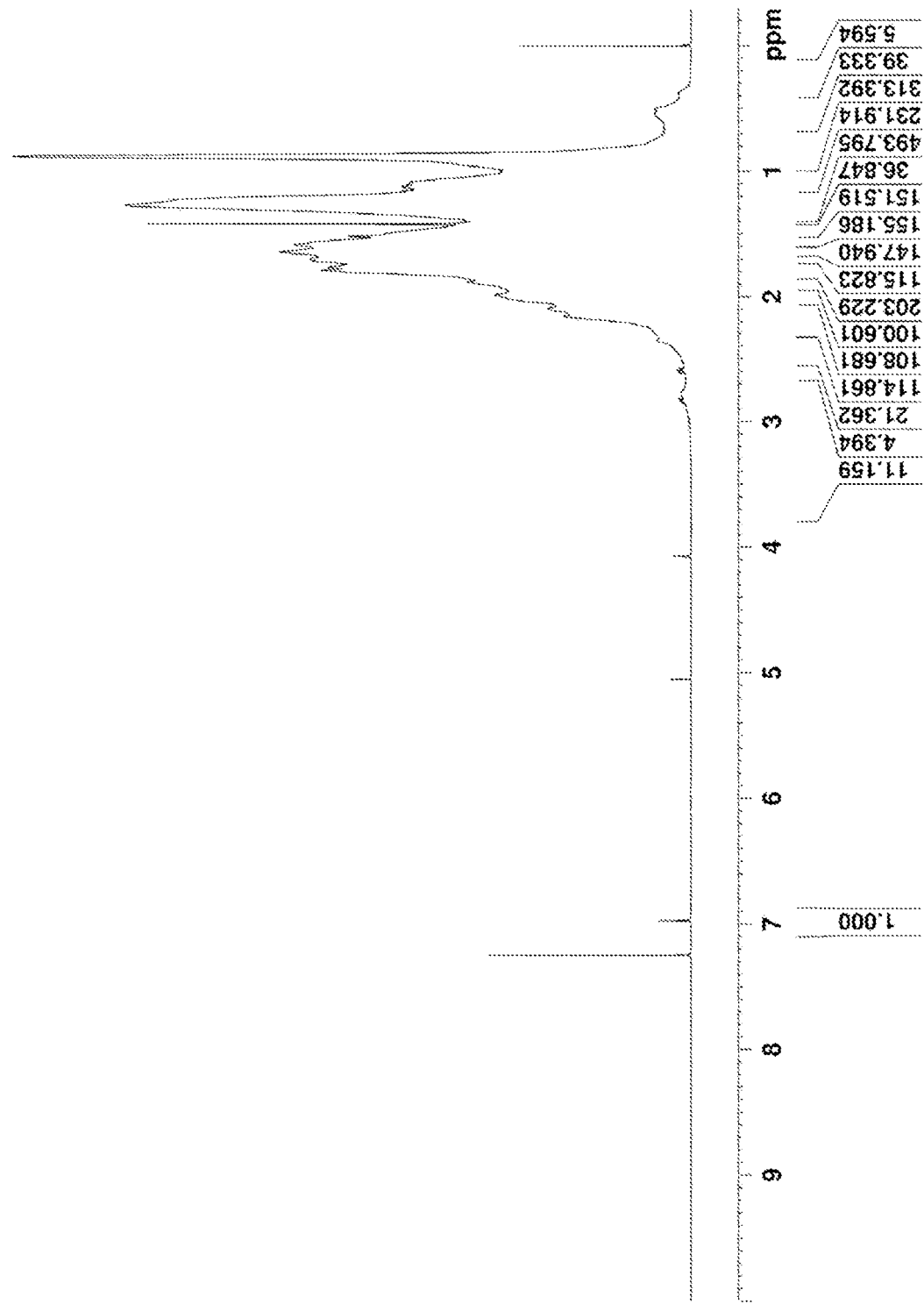
FIG. 2 shows the NMR spectrum of a hydrocarbon resin after hydrogenation in Example 1 according to the present invention.

Also, based on the $^1$H-NMR spectrum measurement results of FIG. 2, the structure of the hydrocarbon resin after hydrogenation showed that the peak representing a methyl group ($-CH_3$) of 1-hexene of 0.85~0.95 ppm was increased, and simultaneously that the peak representing the <—$CH_2$—> chain of 1-hexene of 1.20~1.30 ppm was increased, which means that the above resin was a resin in which DCPD and 1-hexene were copolymerized. Furthermore, the double bond peak of 4.9~6.5 ppm completely disappeared, from which hydrogenation was confirmed to be thoroughly progressed.

Here, upon the $^1$H-NMR spectrum measurement, the peak of 0.85~0.95 ppm is the methyl group of an olefin, the peak of 1.20~1.30 ppm is the <—$CH_2$—> chain of an olefin, and the peak of 4.9~6.5 ppm is the double bond of a diolefin. As is apparent from the results of FIGS. 1 and 2, the values of individual peaks are compared, whereby whether the copolymerization of DCPD and olefin and the hydrogenation were progressed can be determined.

Examples 2 to 9 and Comparative Examples 1 to 5

The hydrocarbon resins of Examples 2 to 9 and Comparative Examples 1 to 5 were prepared in the same manner as in Example 1 under the conditions of Table 1 below.

Figure 3:
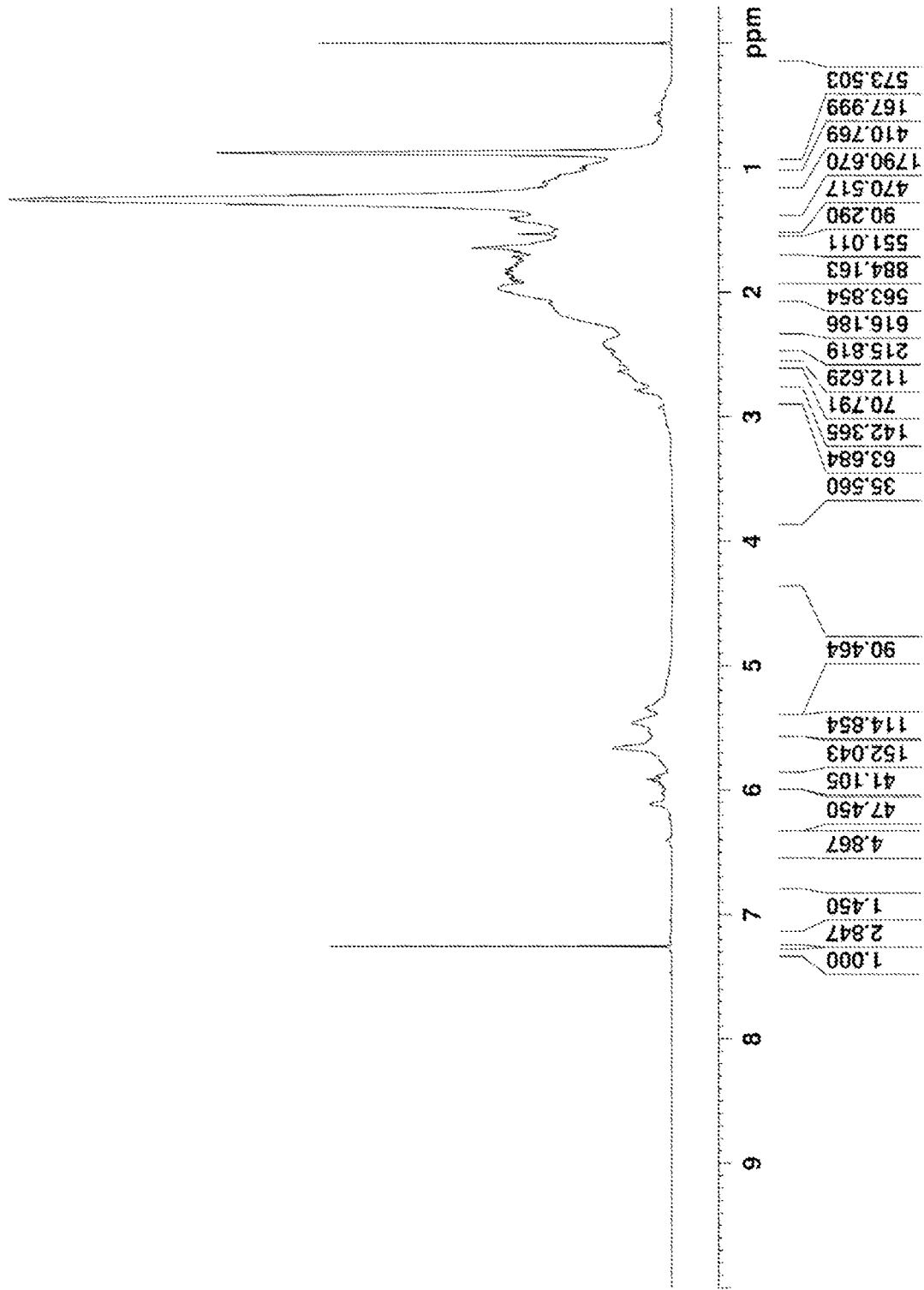
FIG. 3 shows the NMR spectrum of a polymer before hydrogenation in Example 5 according to the present invention.
Figure 4:
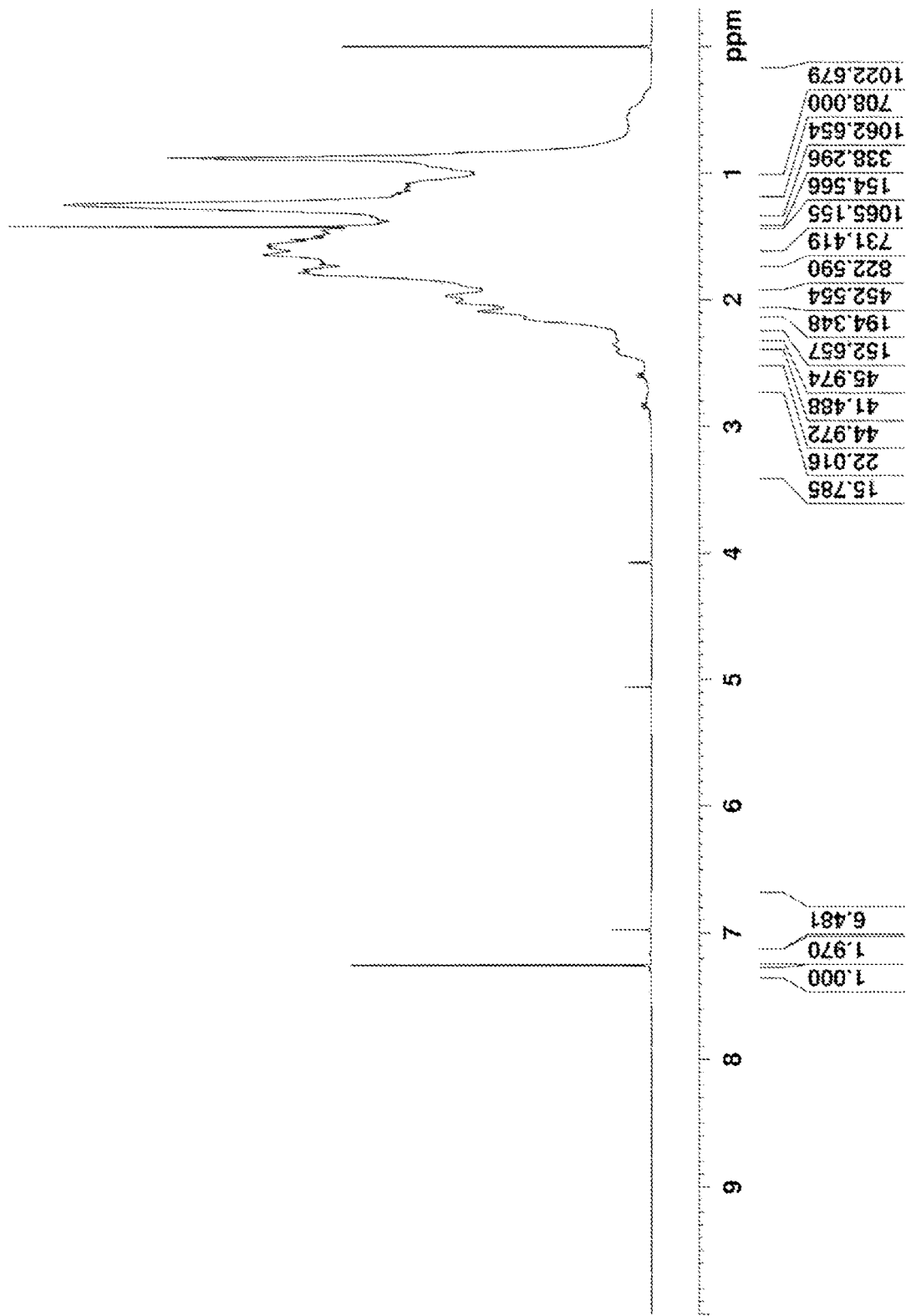
FIG. 4 shows the NMR spectrum of a hydrocarbon resin after hydrogenation in Example 5 according to the present invention.
Figure 5:
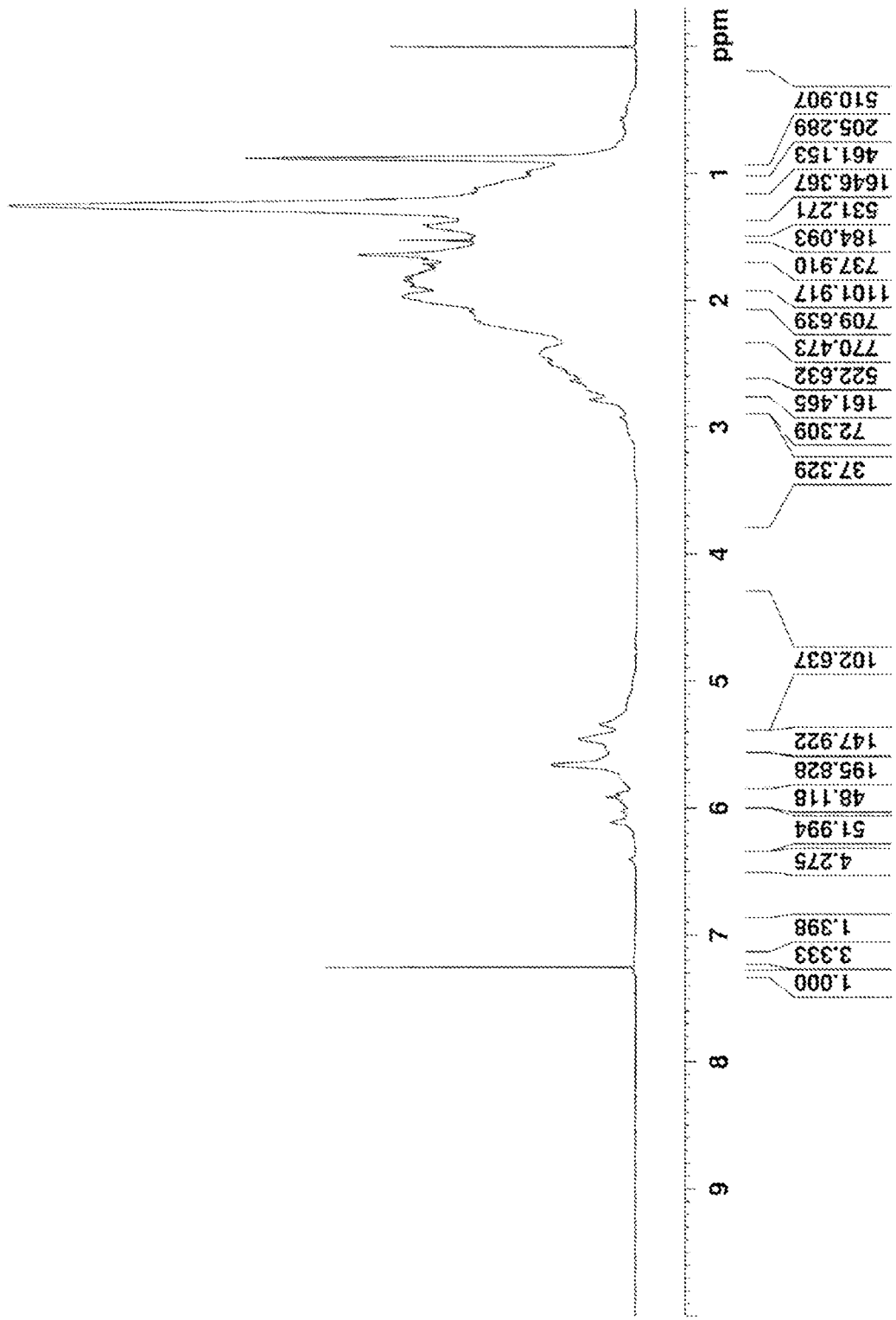
FIG. 5 shows the NMR spectrum of a polymer before hydrogenation in Example 7 according to the present invention.
Figure 6:
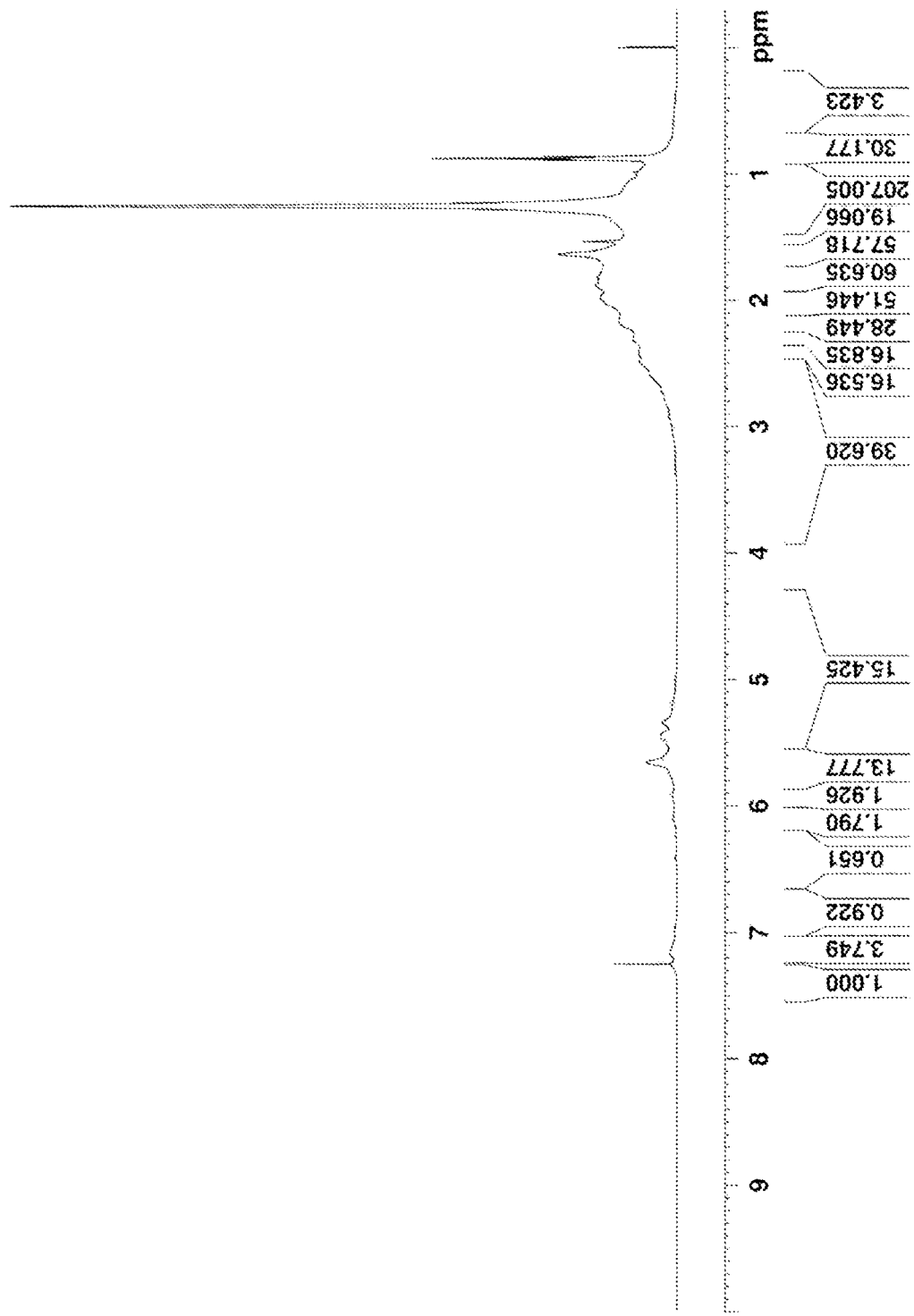
FIG. 6 shows the NMR spectrum of a polymer before hydrogenation in Example 8 according to the present invention.
Figure 7:
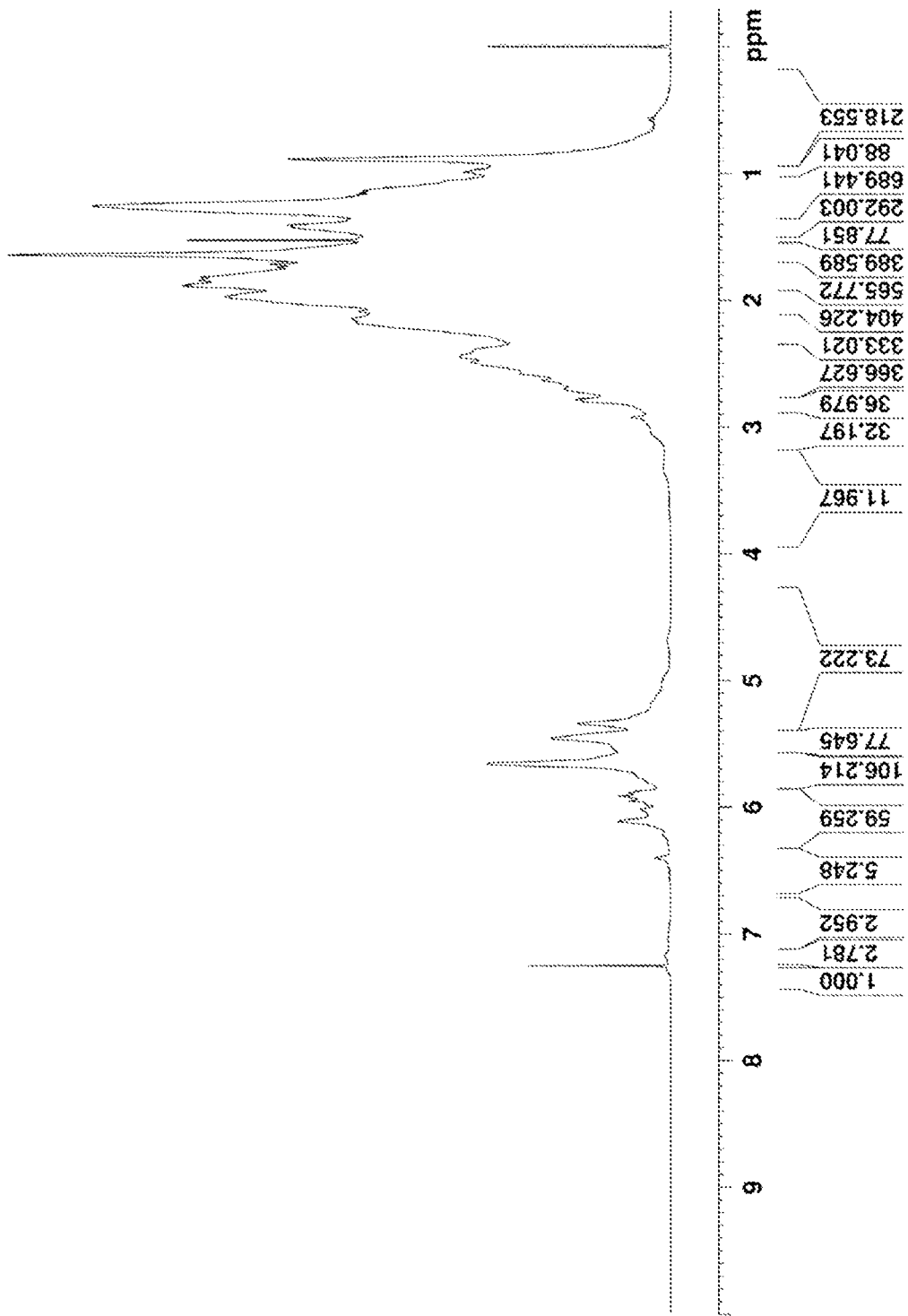
FIG. 7 shows the NMR spectrum of a polymer before hydrogenation in Example 9 according to the present invention.

The $^1$H-NMR spectrum results of the polymer before hydrogenation and the hydrocarbon resin after hydrogenation in Example 5 are shown in FIG. 3 (before hydrogenation) and FIG. 4 (after hydrogenation), respectively, the $^1$H-NMR spectrum results of the polymer before hydrogenation in Example 7 are shown in FIG. 5, the $^1$H-NMR spectrum results of the polymer before hydrogenation in Example 8 are shown in FIG. 6, and the $^1$H-NMR spectrum results of the polymer before hydrogenation in Example 9 are shown in FIG. 7.

Comparative Example 6

In a 1 L autoclave, 2.0 mol of dicyclopentadiene (DCPD) was dissolved in 4 mol of a toluene solvent, and the reactor was closed, after which the reaction temperature was maintained at 270° C. and the reaction was terminated after 2 hr. After completion of the reaction, the produced polymer was distilled at 240° C. for 5 min to recover unreacted oil fractions, thus obtaining 57 g of the remaining polymer.

The 57 g of the polymer thus obtained was added with a hydrogenation solvent, toluene, in an amount 1.5 times the amount thereof and thus completely dissolved, and was then placed in a 1 L autoclave. Thereafter, 0.2 mol of a palladium catalyst was added thereto, and the reactor was closed, after which a hydrogenation reaction was carried out at a hydrogen pressure of 80 bar and a temperature of 230° C. for 90 min. After termination of the reaction, the produced reaction liquid was distilled in a vacuum of 10 torr at 260° C. for 10 min, thereby yielding 53 g of a hydrogenated hydrocarbon resin. The kinds and amounts of individual components thereof are given in Table 1 below.

Figure 8:
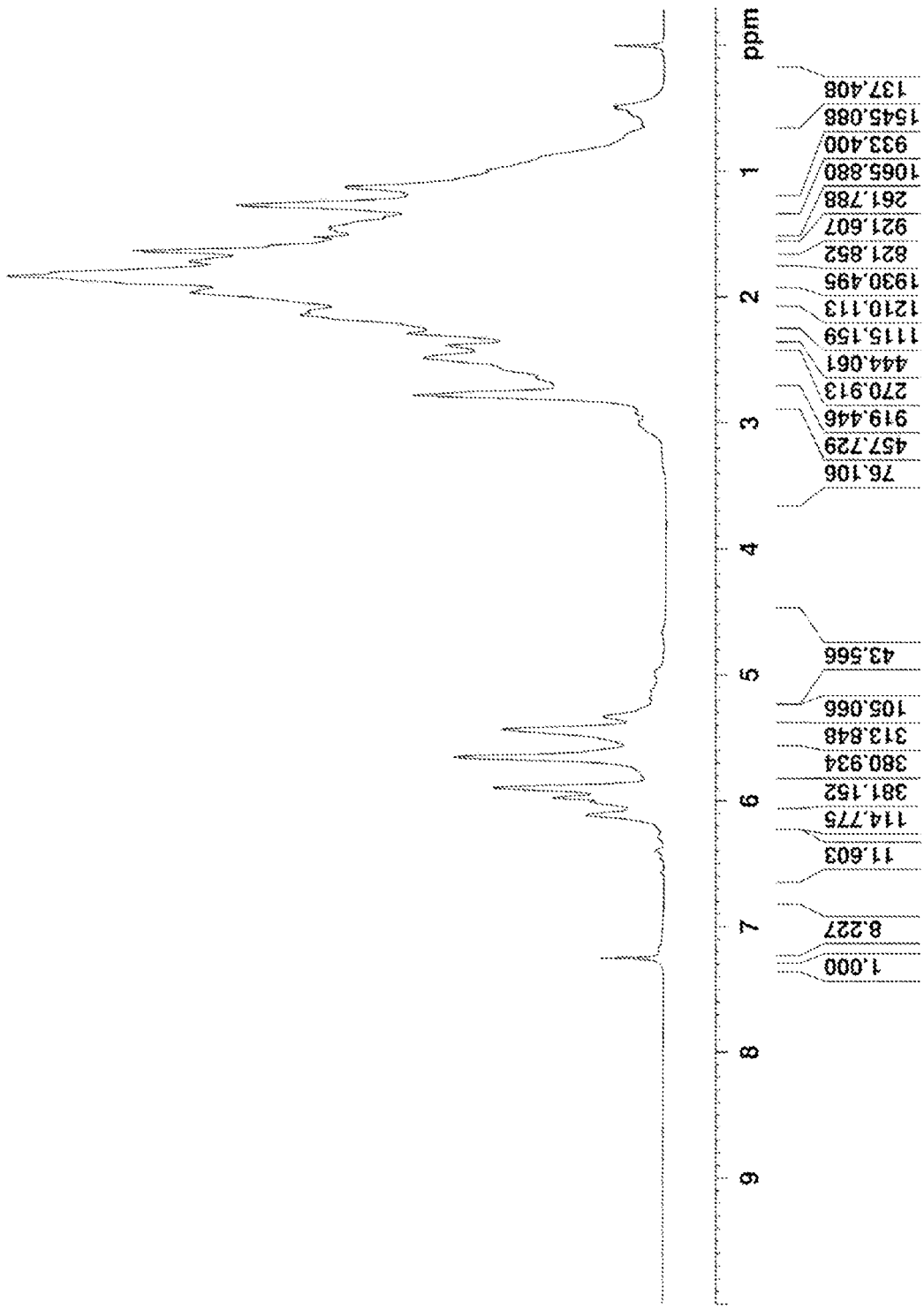
FIG. 8 shows the NMR spectrum of a polymer before hydrogenation in Comparative Example 6 according to the present invention.
Figure 9:
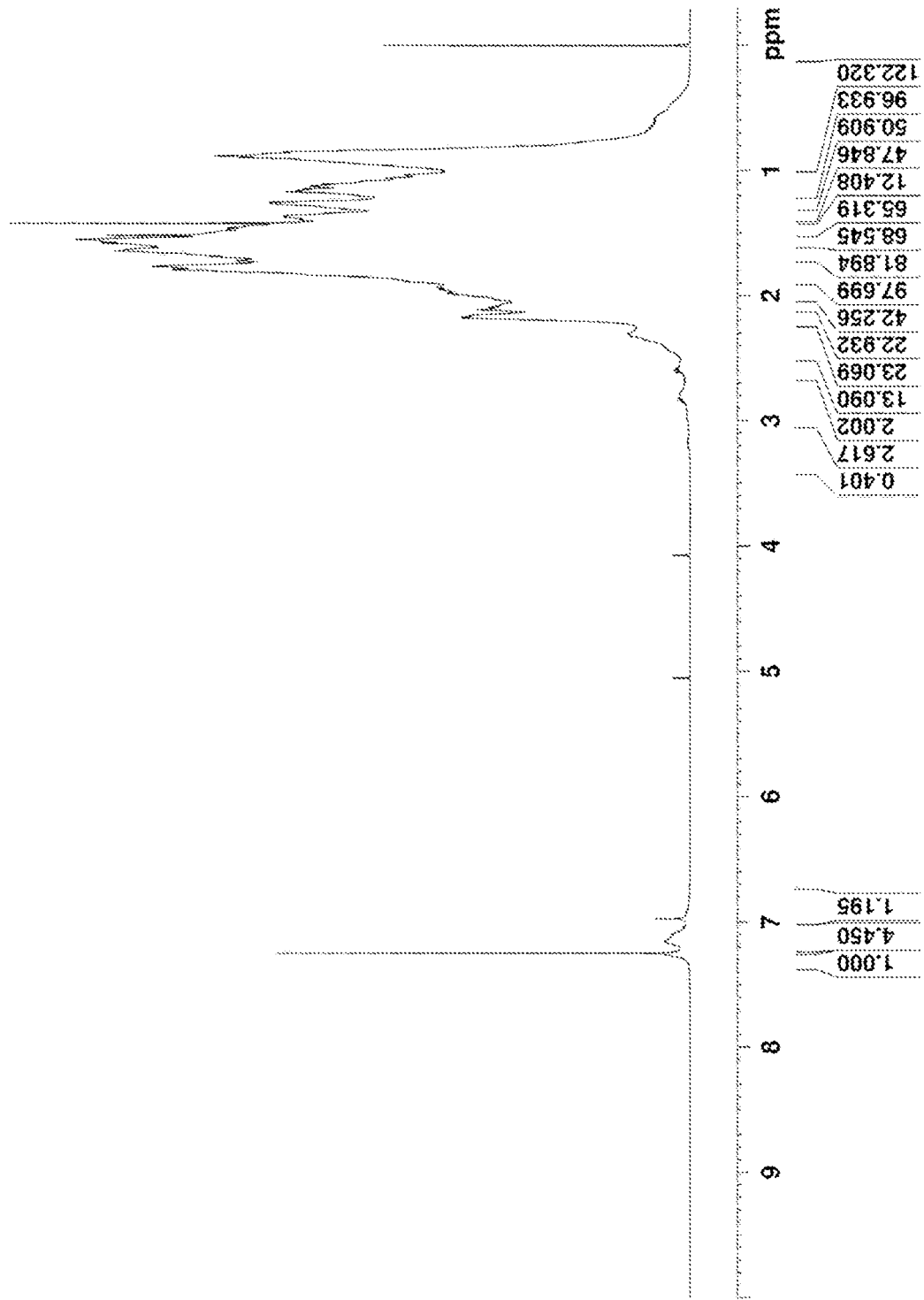
FIG. 9 shows the NMR spectrum of a hydrocarbon resin after hydrogenation in Comparative Example 6 according to the present invention.

Whether the polymer before hydrogenation and the hydrocarbon resin after hydrogenation were polymerized was determined using an NMR spectrometer (500 NMR made by Bruker, 14.1 tesla). The results are shown in FIGS. 8 and 9.

Comparative Examples 7 and 8

The hydrocarbon resins of Comparative Examples 7 and 8 were prepared in the same manner as in Comparative Example 6 under the conditions shown in Table 1 below.

Comparative Examples 9 and 10

In a 1 L autoclave, dicyclopentadiene (DCPD) was dissolved in 500 ml of a toluene solvent, and a polymerization controller, tricyclodecene (TCDE), was added thereto. Also, an initiator was added thereto, and the reactor was closed, after which an olefin was added thereto and the resulting mixture was added with a catalyst and then allowed to react. The reaction temperature was maintained at 40° C. and the reaction was terminated after 2 hr. After completion of the reaction, the produced polymer was mixed with 300 g of water to separate the catalyst, and was then distilled at 240° C. for 5 min to recover unreacted oil fractions, thus obtaining the remaining polymer.

300 g of the polymer thus obtained was added with a hydrogenation solvent, toluene, in an amount 1.5 times the amount thereof and thus completely dissolved, and was then placed in a 1 L autoclave. Thereafter, 60 g of a palladium catalyst was added thereto, and the reactor was closed, after which a hydrogenation reaction was carried out at a hydrogen pressure of 80 bar and a temperature of 230° C. for 90 min. After termination of the reaction, the produced reaction liquid was distilled in a vacuum of 5 torr at 250° C. for 5 min, thereby yielding a hydrogenated hydrocarbon resin. The kinds and amounts of individual components thereof are given in Table 1 below.

TABLE 1

| | Material (mol) | | | | | | | | | |
|---|---|---|---|---|---|---|---|---|---|---|
| | Diolefin | Olefin | | | | | | | | |
| No. | DCPD | Propylene | Butene | Piperylene | 1-Hexene | 1-Octene | 1-Decene | 1-Dodecene | 2-Octene |
| Ex. 1 | 1.5 | | | | 0.5 | | | | |
| Ex. 2 | 1.5 | | | | 0.5 | | | | |
| Ex. 3 | 1.7 | | | | 0.3 | | | | |
| Ex. 4 | 1.5 | | | | | 0.5 | | | |
| Ex. 5 | 1.5 | | | | | 0.5 | | | |
| Ex. 6 | 1.7 | | | | | 0.3 | | | |
| Ex. 7 | 1.5 | | | | | | 0.5 | | |
| Ex. 8 | 1.5 | | | | | | | 0.5 | |
| Ex. 9 | 1.4 | | | | | | | | 0.6 |
| C. Ex. 1 | 1.0 | 1.0 | | | | | | | |
| C. Ex. 2 | 1.0 | | 1.0 | | | | | | |
| C. Ex. 3 | 1.5 | | | 0.5 | | | | | |
| C. Ex. 4 | 1.5 | | | 0.5 | | | | | |
| C. Ex. 5 | 1.5 | | | 0.5 | | | | | |
| C. Ex. 6 | 2.0 | | | | | | | | |
| C. Ex. 7 | 2.0 | | | | | | | | |
| C. Ex. 8 | 2.0 | | | | | | | | |
| C. Ex. 9 | 0.8 | | | | 1.6 | | | | |
| C. Ex. 10 | 0.8 | | | | | 1.6 | | | |

| | Catalyst | Initiator | Hydrogenation catalyst | Polymerization conditions | | Hydrogenation conditions | |
|---|---|---|---|---|---|---|---|
| No. | (mol) AlCl$_3$ | (mol) t-BuCl | (mol) Pd | Temp (° C.) | Time (hr) | Temp. (° C.) | Time (hr) |
| Ex. 1 | | | 0.2 | 270 | 2 | 230 | 1.5 |
| Ex. 2 | | | 0.2 | 280 | 2 | 230 | 1.5 |
| Ex. 3 | | | 0.2 | 280 | 2 | 230 | 1.5 |
| Ex. 4 | | | 0.2 | 270 | 2 | 230 | 1.5 |
| Ex. 5 | | | 0.2 | 280 | 2 | 230 | 1.5 |
| Ex. 6 | | | 0.2 | 280 | 2 | 230 | 1.5 |
| Ex. 7 | | | 0.2 | 280 | 2 | 230 | 1.5 |
| Ex. 8 | | | 0.2 | 280 | 2 | 230 | 1.5 |
| Ex. 9 | | | 0.2 | 280 | 2 | 230 | 1.5 |
| C. Ex. 1 | | | 0.2 | 280 | 2 | 230 | 1.5 |
| C. Ex. 2 | | | 0.2 | 280 | 2 | 230 | 1.5 |
| C. Ex. 3 | | | 0.2 | 270 | 2 | 230 | 1.5 |
| C. Ex. 4 | | | 0.2 | 280 | 2 | 230 | 1.5 |
| C. Ex. 5 | | | 0.2 | 290 | 2 | 230 | 1.5 |
| C. Ex. 6 | | | 0.2 | 270 | 2 | 230 | 1.5 |
| C. Ex. 7 | | | 0.2 | 280 | 2 | 230 | 1.5 |
| C. Ex. 8 | | | 0.2 | 290 | 2 | 230 | 1.5 |
| C. Ex. 9 | 0.038 | 0.075 | 0.2 | 40 | 2 | 230 | 1.5 |
| C. Ex. 10 | 0.038 | 0.075 | 0.2 | 40 | 2 | 230 | 1.5 |

<Evaluation of Properties of Resin>
1) Yield
The yield was determined as follows.

Yield (%)=obtained resin (g)/total of added monomers (g)*100

(2) Softening Point
A softening point was measured using a ring-and-ball softening method (ASTM E 28). The resin was dissolved and placed in a ring-shaped mold, which was then hung on a beaker containing glycerin, after which a ball was placed on the resin-containing ring and the temperature was elevated at a rate of 2.5° C./min to reach the temperature at which the resin was dissolved, and the temperature (softening point) at which the ball fell was measured. The results are shown in Table 3 below.

(3) Molecular Weight
Through gel permeation chromatography (GPC) (PL GPC-220) using a polystyrene standard, a weight average molecular weight, a number average molecular weight and a z-average molecular weight were measured. The hydrogenated hydrocarbon resin to be measured was dissolved in 1,2,4-trichlorobenzene so as to have a concentration of 0.34 wt %, and 288 μL thereof was introduced into GPC. The mobile phase of GPC was 1,2,4-trichlorobenzene, and was introduced at a flow rate of 1 mL/min, and analysis was conducted at 130° C. Two guard columns and one PL 5 μm mixed-D column were connected in series. Measurement was performed by elevating the temperature to 250° C. at a rate of 10° C./min using a differential scanning calorimeter, and analysis was conducted in an $N_2$ atmosphere up to the 2nd scan. The results are shown in Table 3 below.

In Table 3, Mw indicates the weight average molecular weight, and MWD indicates Mw/Mn.

(4) Analysis of Olefin Content in Polymer
The olefin content (mol %) in the polymer was analyzed based on $^1$H-NMR spectrum results using an NMR spectrometer (500 NMR made by Bruker, 14.1 tesla).

(5) Color (APHA)
Color was measured in accordance with ASTM D1544. Specifically, 10.0 g of the hydrogenated hydrocarbon resin was dissolved in 10.0 g of toluene and was then placed in a quartz cell having a rectangular cross-section (a width of 5 cm, a length of 4 cm and a path length of 50 mm). This cell was mounted to a PFX195 colorimeter and operated to measure an APHA color.

(6) Specific Gravity
A specific gravity was measured in accordance with ASTM D71. Specifically, 5 g of the hydrogenated hydrocarbon resin was dissolved on a hot plate at 200° C. and poured into a sphere-shaped mold, and the cured hydrogenated hydrocarbon resin having a sphere shape was removed from the mold and then placed in a densimeter (QUALITEST: Densimeter SD-200L) to measure the specific gravity thereof.

(7) Odor Intensity
The odor intensity of the hydrocarbon resin was evaluated using a panel comprising five male and female participants. 10 g of the hydrocarbon resin was placed in a 100 ml beaker, which was then placed in an oven at 180° C. for 30 min. The beaker in a hot state was taken out of the oven and the odor generated from the hydrocarbon resin was evaluated. The odor intensity was evaluated in a manner in which the participants smelled the odor, and the results thereof were classified into numerical values according to the classification table of Table 2 below, after which a score from 0 to 5 was assigned and the average score was calculated.

TABLE 2

| Score | Odor intensity | Description |
|---|---|---|
| 0 | None | Relatively odorless level and state in which no smell is detected |
| 1 | Threshold | State of not being able to identify the smell but being able to sense the smell |
| 2 | Moderate | State of being able to identify the smell |
| 3 | Strong | Strong smell that is easy to detect (state of being able to detect the unique smell of cresol in hospital) |
| 4 | Very strong | Very strong smell (severe condition in conventional toilet) |
| 5 | Over strong | Extremely strong smell that is hard to withstand to the extent of feeling interference with breathing |

<Results of Evaluation of Properties of Resin>
The results measured as above are shown in Table 3 below.

TABLE 3

| No. | Yield (%) | Softening point (° C.) | Molecular weight Mw | Molecular weight MWD | Olefin content in polymer (mol %) | Color (APHA) | Specific gravity | Odor intensity |
|---|---|---|---|---|---|---|---|---|
| Ex. 1 | 91 | 85 | 850 | 1.8 | 21 | 20 | 1.05 | 1.0 |
| Ex. 2 | 100 | 100 | 1000 | 2 | 23 | 20 | 1.05 | 1.0 |
| Ex. 3 | 100 | 110 | 1150 | 2.1 | 13 | 30 | 1.05 | 0.9 |
| Ex. 4 | 90 | 88 | 870 | 1.7 | 20 | 20 | 1.05 | 0.9 |
| Ex. 5 | 99 | 102 | 1100 | 2 | 21 | 20 | 1.05 | 0.8 |
| Ex. 6 | 100 | 115 | 1210 | 2 | 12 | 30 | 1.05 | 0.7 |
| Ex. 7 | 100 | 105 | 1300 | 2 | 19 | 30 | 1.05 | 0.5 |
| Ex. 8 | 100 | 109 | 1320 | 2 | 17 | 35 | 1.05 | 0.5 |
| Ex. 9 | 90 | 100 | 1150 | 1.8 | 15 | 30 | 1.05 | 0.6 |
| C. Ex. 1 | 60 | 75 | 800 | 2.2 | 35 | 20 | 1.1 | 2.5 |
| C. Ex. 2 | 75 | 83 | 820 | 2.1 | 41 | 20 | 1.08 | 2.0 |
| C. Ex. 3 | 80 | 80 | 705 | 1.9 | 19 | 20 | 1.08 | 2.0 |
| C. Ex. 4 | 85 | 86 | 810 | 2.1 | 21 | 20 | 1.08 | 2.0 |
| C. Ex. 5 | 95 | 101 | 1050 | 2.2 | 22 | 20 | 1.1 | 2.2 |
| C. Ex. 6 | 90 | 100 | 550 | 1.7 | 0 | 15 | 1.1 | 3.5 |
| C. Ex. 7 | 99 | 120 | 670 | 1.9 | 0 | 20 | 1.1 | 3.5 |
| C. Ex. 8 | 100 | 160 | 700 | 2.2 | 0 | 25 | 1.1 | 3.9 |
| C. Ex. 9 | 50 | 95 | 1390 | 2.4 | 35 | 30 | 1.05 | 1.2 |
| C. Ex. 10 | 52 | 97 | 1750 | 2.7 | 33 | 30 | 1.05 | 1.0 |

As is apparent from Table 3, Examples 1 to 8 exhibited a yield of 90% or more. Also, Examples 1 to 8 were considerably reduced in odor compared to Comparative Examples 1 to 8.

In Comparative Example 1, pertaining to the preparation of a hydrocarbon resin using propylene as disclosed in Korean Patent Application No. 2013-0111233, a remarkably lowered yield, a high specific gravity and a considerably high odor resulted.

In Comparative Examples 9 and 10, pertaining to the polymerization using the cation catalyst, a remarkably lowered yield and a considerably high molecular weight and molecular weight distribution resulted.

Therefore, the method of preparing the hydrocarbon resin according to the present invention includes thermal polymerization at a high temperature of about 200~300° C. without the use of a catalyst and then hydrogenation, unlike the conventional hydrocarbon resin preparation including low-temperature polymerization at about 40° C. in the presence of a cation catalyst and then hydrogenation, thus obviating a catalyst removal process, whereby the yield was increased and thus productivity was significantly increased, and simultaneously the extent of odor was almost the same as or superior to conventional cases.

Based on the $^1$H-NMR spectrum results of Examples 1 and and Comparative Example 6, the results of measurement of respective peak area ratios are shown in Table 4 below, in which Examples 1 and 5 exhibited S1 of 20% or more and S2 of 50% or more.

TABLE 4

|  | Hydrogenated hydrocarbon resin material | S1 (A1/A3) | S2 (A2/A3) | FIG. |
|---|---|---|---|---|
| C. Ex. 6 | DCPD | 24% | 43% | FIG. 9 |
| Ex. 1 | Hex/DCPD | 27% | 65% | FIG. 2 |
| Ex. 5 | Oct/DCPD | 23% | 54% | FIG. 4 |

Below, adhesives were prepared and the performance thereof was evaluated.

<Evaluation of Performance of Adhesive>

Compatibility, viscosity, and softening point were measured using the methods described in the evaluation of properties of the resin above.

(1) Hardness A

Hardness was measured using a shore A hardness meter in accordance with 124ASTM. A sample to be measured was placed on a flat surface and stabbed with a pointed portion of the hardness meter, and the measured value was recorded.

(2) Open Time

The open time was measured using a hot melt tester made by JIT. A predetermined amount of adhesive was applied onto a piece of corrugated cardboard having a size of 5 cm×5 cm, and another piece of corrugated cardboard having a size of 5 cm×10 cm was attached thereto, after which the force required to separate the pieces of corrugated cardboard was recorded at intervals of 5 sec from 0. When the graph was drawn, the time at which rapid descent started was recorded.

(3) Set Time

The set time was measured using a hot melt tester made by JIT. A predetermined amount of adhesive was applied onto a piece of corrugated cardboard having a size of 5 cm×5 cm, and another piece of corrugated cardboard having a size of 5 cm×10 cm was attached thereto, after which the force required to separate the pieces of corrugated cardboard was recorded at intervals of 0.5 sec from 0. When the graph was drawn, the time at which the force value of the Y-axis started to become constant was recorded.

(4) Peel Strength

Peel strength was measured using a universal testing machine (UTM). A sample (adhesive) was applied to a thickness of 25 μm on a piece of PET film to manufacture a tape specimen. The tape specimen was attached to a SUS304 steel plate. The portion of the steel plate to which the PET film was attached was mounted to the UTM grip and measurement was performed at a speed of 30 mm/min. Here, the numerical value input to the UTM indicates the peel strength (kgf/in).

(5) Evaluation of Tackiness: Ball Tack

Tackiness was evaluated in accordance with ASTM D3121.

A tape test specimen coated to a thickness of 20~30 μm with the adhesive was cut to a size of 10 cm in width and 50 cm in length. A ball tack tester (JIS 20237) was placed on one end of the test specimen at a standard inclination angle of 30°, and a steel ball No. 9 was rolled thereon to measure a rolling distance. The smaller the rolling distance, the higher the tackiness.

(6) Evaluation of Adhesion: Holding Power

Adhesion was evaluated in accordance with ASTM D3330.

A tape test specimen coated at a thickness of 20~30 μm with the adhesive was cut to a size of 2 inches in width and 6 inches in length. The test specimen was attached to release paper, cut to a size of 1 inch in width and 2 inches in length, and then attached to a washed SUS304 steel plate (a portion of the test specimen necessary for measurement, other than about 2 cm or more of the end thereof, was attached, and was then pressed once through reciprocal rolling using a roll-down tester made by Cheminstruments). The end of the test specimen that was not attached to the SUS304 steel plate was cut to about 2 cm using scissors, passed through a ring for measuring cohesion, folded, and then adhered to the portion of the test specimen. As such, the adhered end of the test specimen was fixed in a manner in which the front and rear surfaces thereof were each attached with two pieces of scotch tape parallel to the transverse end of the SUS304 steel plate having the test specimen attached thereto, and were also stapled two times parallel to each other between the ring for measuring cohesion and the SUS304 steel plate. A portion of the test specimen was cut so that the test specimen having a size of 1 inch in width and 1 inch in length was attached to the SUS304 steel plate.

The test specimen was hung on a SUS steel plate holder in a shear test oven. A 1 kg weight was hung on the ring for measuring holding power that was attached to the test specimen, and the time at which the weight fell was recorded using a timer.

(7) Evaluation of Adhesion: SAFT

Adhesion was evaluated in accordance with ASTM D3654.

A tape test specimen coated to a thickness of 20~30 μm with the adhesive was cut to a size of 2 inches in width and 6 inches in length. The test specimen was attached to release paper, cut to a size of 1 inch in width and 2 inches in length, and then attached to a washed SUS304 steel plate (a portion of the test specimen necessary for measurement, other than about 2 cm or more of the end thereof, was attached, and was then pressed through reciprocal rolling once using a roll-down tester made by Cheminstruments). The end of the test specimen that was not attached to the SUS304 steel plate was cut to about 2 cm using scissors, passed through a ring for measuring cohesion, folded, and then adhered to the portion of the test specimen. As such, the adhered end of the test specimen was fixed in a manner in which the front and rear surfaces thereof were each attached with two pieces of scotch tape parallel to the transverse end of the SUS304 steel plate having the test specimen attached thereto, and were also stapled two times parallel to each other between the ring for measuring cohesion and the SUS304 steel plate. A portion of the test specimen was cut so that the test specimen having a size of 1 inch in width and 1 inch in length was attached to the SUS304 steel plate.

The test specimen was hung on a SUS steel plate holder in a shear test oven. A 1 kg weight was hung on the ring for measuring holding power that was attached to the test specimen, and the time at which the weight fell under the condition that the temperature of the oven was elevated at a rate of 0.4° C./min was recorded.

(8) Evaluation of Heat Resistance 10 g of a sample was placed in a test tube and then aged in an oven at 180° C. After 24 hr, heat resistance was measured using a Gardner color scale. The Gardner color scale has 18 colors in total, and the color closest to one of the scale colors was observed with the naked eye and recorded.

which the resin was dissolved, and the temperature (softening point) at which the ball fell was measured. The results are shown in Table 3 below.

<Preparation of Adhesive>

Adhesive A

As adhesives A (HMPSAs) of Examples 2, 6, 8 and 9 and Comparative Examples 4 and 6, me-PE-based hot-melt pressure-sensitive adhesives (HMPSAs) were prepared by mixing 100 parts by weight of a mixture comprising 20 wt % of a polymer, namely Infuse 9807 (a metallocene-catalyzed ethylene-based polyolefin block copolymer) made by Dow Chemical, 20 wt % of oil, namely KL-240 (made by Michang Petrochemical) and 60 wt % of the hydrocarbon resin of each of Examples and Comparative Examples with 0.75 parts by weight of an antioxidant (Songnox 1010, made by Songwon Industrial).

The four materials (hydrocarbon resin, polymer, oil, and antioxidant) were placed in a 100 ml beaker and stirred at 180° C. for 4 hr. The parts by weight thereof and the results of evaluation of the properties thereof are shown in Table 5 below.

TABLE 5

| | | | Adhesive A of Ex. 2 | Adhesive A of Ex. 6 | Adhesive A of Ex. 8 | Adhesive A of Ex. 9 | Adhesive A of C. Ex. 4 | Adhesive A of C. Ex. 6 |
|---|---|---|---|---|---|---|---|---|
| HMPSA Formulation | HCR (wt %) | Ex. 2 | 60 | | | | | |
| | | Ex. 6 | | 60 | | | | |
| | | Ex. 8 | | | 60 | | | |
| | | Ex. 9 | | | | 60 | | |
| | | C. Ex. 4 | | | | | 60 | |
| | | C. Ex. 6 | | | | | | 60 |
| | Polymer (wt %) | Infuse 9807 | 20 | 20 | 20 | 20 | 20 | 20 |
| | Oil (wt %) | KL240 | 20 | 20 | 20 | 20 | 20 | 20 |
| | Antioxidant | Songnox 1010 | | | | 0.75 wt part | | |
| HMPSA Properties | Softening Point (° C.) | | 103.5 | 104 | 104 | 101 | 101 | 103.5 |
| | Viscosity (cps) | 160° C. | 5153 | 5241 | 5198 | 5185 | 3854 | 4951 |
| | | 180° C. | 2878 | 2954 | 2869 | 2854 | 2538 | 2806 |
| | Ball Tack (Ball No. 9) | Initial | 9 | 20 | 30 | 15 | 25 | 24 |
| | | *Aged | 14 | 26 | 40 | 19 | 35 | 34 |
| | Peel strength (gf/in, at SUS) | Initial | 1952 | 2107 | 2366 | 1852 | 1260 | 1285 |
| | | *Aged | 1598 | 1918 | 1538 | 1452 | 1205 | 1220 |
| | Holding power (min, 30° C.) | Initial | 682 | 754 | 3675 | 582 | 135 | 170 |
| | | *Aged | 542 | 685 | 2610 | 482 | 105 | 152 |
| | SAFT (° C., at SUS, Ramp 0.4° C./min) | Initial | 49 | 51 | 56 | 49 | 45 | 47 |
| | | *Aged | 49 | 49 | 55 | 48 | 44 | 46 |
| | Gardner color | 180° C. * 24 hours | 5 | 5 | 4 | 5 | 7 | 8 |
| | Odor intensity | | 1.1 | 1.0 | 1.0 | 1.0 | 2.3 | 2.4 |

(9) Viscosity

Viscosity was measured using a viscometer made by Brookfield. 10.5 g of a sample was placed on a spindle No. 27 in a HT-2DB chamber. The temperature was elevated to a desired measurement temperature and then stabilized for 30 min. The viscosity value when the torque was 50% starting from 0.5, which is the stirring shaft RPM, was recorded.

(10) Softening Point

A softening point was measured using a ring-and-ball softening method (ASTM E 28). The resin was dissolved and placed in a ring-shaped mold, which was then hung on a beaker containing glycerin, after which a ball was placed on the resin-containing ring and the temperature was elevated at a rate of 2.5° C./min to reach the temperature at In the above table, *Aged indicates the results of measurement of each sample after having been allowed to stand at 70° C. for 3 days.

Adhesive B

As adhesives B (HMPSAs) of Examples 2, 6, 8 and 9 and Comparative Examples 4 and 6, me-PP-based HMPSAs were prepared by mixing 100 parts by weight of a mixture comprising 20 wt % of a polymer, namely Vistamaxx 6202 (metallocene-catalyzed polypropylene) made by ExxonMobil Chemical, 20 wt % of a polymer, namely Vestoplast 703 (Amorphous propylene-ethylene copolymer) made by Evonik, 22.5 wt % of oil, namely KL-240 (made by Michang Petrochemical) and 50 wt % of the hydrocarbon resin of each of Examples and Comparative Examples with 0.75 parts by weight of an antioxidant (Songnox 1010, made by Songwon Industrial).

The four materials (hydrocarbon resin, polymer, oil, and antioxidant) were placed in a 100 ml beaker and stirred at 180° C. for 4 hr. The parts by weight thereof and the results of evaluation of the properties thereof are shown in Table 6 below.

TABLE 6

|  |  |  | Adhesive B of Ex. 2 | Adhesive B of Ex. 6 | Adhesive B of Ex. 8 | Adhesive B of Ex. 9 | Adhesive B of C. Ex. 4 | Adhesive B of C. Ex. 6 |
|---|---|---|---|---|---|---|---|---|
| HMPSA Formulation | HCR (wt %) | Ex. 2 | 50 |  |  |  |  |  |
|  |  | Ex. 6 |  | 50 |  |  |  |  |
|  |  | Ex. 8 |  |  | 50 |  |  |  |
|  |  | Ex. 9 |  |  |  | 50 |  |  |
|  |  | C. Ex. 4 |  |  |  |  | 50 |  |
|  |  | C. Ex. 6 |  |  |  |  |  | 50 |
|  | Polymer (wt %) | Vistamaxx 6202 | 20 | 20 | 20 | 20 | 20 | 20 |
|  |  | Vestoplast 703 | 7.5 | 7.5 | 7.5 | 7.5 | 7.5 | 7.5 |
|  | Oil (wt %) | KL-240 | 22.5 | 22.5 | 22.5 | 22.5 | 22.5 | 22.5 |
|  | Antioxidant | Songnox 1010 |  |  | 0.75 wt part |  |  |  |
| HMPSA Properties | Softening Point (° C.) |  | 89 | 92 | 91 | 90 | 85 | 88 |
|  | Viscosity (cps) | 160° C. | 8950 | 9152 | 9080 | 8502 | 7521 | 8065 |
|  |  | 180° C. | 4780 | 5186 | 5100 | 4950 | 3852 | 4580 |
|  | Ball Tack (Ball No. 9) | Initial | 11.0 | 17.0 | 20 | 12 | 11 | 11.0 |
|  |  | *Aged | 10 | 14 | 25 | 11 | 11 | 12 |
|  | Peel strength (gf/in, at SUS) | Initial | 900 | 1238 | 1352 | 850 | 752 | 800 |
|  |  | *Aged | 750 | 1070 | 1242 | 750 | 582 | 651 |
|  | Holding power (min, 30° C.) | Initial | 85 | 141 | 165 | 80 | 68 | 74 |
|  |  | *Aged | 66 | 121 | 138 | 60 | 65 | 57 |
|  | SAFT (° C., at SUS, Ramp 0.4° C./min) | Initial | 42 | 43 | 50 | 41 | 40 | 42 |
|  |  | *Aged | 44 | 48 | 49 | 40 | 40 | 45 |
|  | Gardner color | 180° C. * 24 hours | 6 | 6 | 6 | 7 | 9 | 9 |
|  | Odor intensity |  | 1.4 | 1.4 | 1.3 | 1.4 | 2.2 | 1.8 |

In the above table, *Aged indicates the results of measurement of each sample after having been allowed to stand at 70° C. for 3 days.

Adhesive C

As adhesives C (HMPSAs) of Examples 2, 6, 8 and 9 and Comparative Examples 4 and 6, SIS-based HMPSAs were prepared by mixing 100 parts by weight of a mixture comprising 25 wt % of a polymer, namely SIS D-1161 (Styrene-Isoprene-Styrene Block Copolymer) made by Kraton Polymer, 18 wt % of oil, namely KL-240 (made by Michang Petrochemical) and 57 wt % of the hydrocarbon resin of each of Examples and Comparative Examples with 0.75 parts by weight of an antioxidant (Songnox 1010, made by Songwon Industrial).

The four materials (hydrocarbon resin, polymer, oil, and antioxidant) were placed in a 100 ml beaker and stirred at 180° C. for 4 hr. The parts by weight thereof and the results of evaluation of properties thereof are shown in Table 7 below.

TABLE 7

|  |  |  | Adhesive C of Ex. 2 | Adhesive C of Ex. 6 | Adhesive C of Ex. 8 | Adhesive C of Ex. 9 | Adhesive C of C. Ex. 4 | Adhesive C of C. Ex. 6 |
|---|---|---|---|---|---|---|---|---|
| HMPSA Formulation | HCR (wt %) | Ex. 2 | 57 |  |  |  |  |  |
|  |  | Ex. 6 |  | 57 |  |  |  |  |
|  |  | Ex. 8 |  |  | 57 |  |  |  |
|  |  | Ex. 9 |  |  |  | 57 |  |  |
|  |  | C. Ex. 4 |  |  |  |  | 57 |  |
|  |  | C. Ex. 6 |  |  |  |  |  | 57 |
|  | Polymer (wt %) | SIS D-1161 | 25 | 25 | 25 | 25 | 25 | 25 |
|  | Oil (wt %) | KL-240 | 18 | 18 | 18 | 18 | 18 | 18 |
|  | Antioxidant | Songnox 1010 | 0.75 wt part | 0.75 wt part | 0.75 wt part | 0.75 wt part | 0.75 wt part | 0.75 wt part |
| HMPSA Properties | Softening Point (° C.) |  | 103.5 | 104 | 104 | 102 | 101 | 103.5 |
|  | Viscosity (cps) | 160° C. | 5153 | 5241 | 5198 | 4952 | 3854 | 4951 |
|  |  | 180° C. | 2878 | 2954 | 2869 | 2752 | 2538 | 2806 |

TABLE 7-continued

|  |  | Adhesive C of Ex. 2 | Adhesive C of Ex. 6 | Adhesive C of Ex. 8 | Adhesive C of Ex. 9 | Adhesive C of C. Ex. 4 | Adhesive C of C. Ex. 6 |
|---|---|---|---|---|---|---|---|
| Ball Tack (Ball No. 9) | Initial | 5.1 | 8.4 | 10.5 | 8.0 | 6.5 | 6.4 |
|  | *Aged | 8.1 | 12.6 | 17.0 | 13 | 8.1 | 8.3 |
| Peel strength (gf/in, at SUS) | Initial | 1338 | 1718 | 1958 | 1352 | 1310 | 1332 |
|  | *Aged | 1355 | 1353 | 1524 | 1405 | 1398 | 1438 |
| Holding power (min, 30° C.) | Initial | 1020 | 1920 | 2554 | 592 | 293 | 383 |
|  | *Aged | 2054 | 3396 | 3514 | 1155 | 538 | 674 |
| SAFT (° C., at SUS, Ramp 0.4° C./min) | Initial | 53 | 56 | 68 | 50 | 49 | 51 |
|  | *Aged | 62 | 64 | 65 | 51 | 52 | 56 |
| Gardner color | 180° C. * 24 hours | 6 | 6 | 5 | 6 | 9 | 10 |
| Odor intensity |  | 1.5 | 1.1 | 1.1 | 1.6 | 3.5 | 3 |

Adhesive D

As adhesives D (HMAs) of Examples 2, 6, 7 and 8 and Comparative Examples 4, 6, 7 and 9, me-PE-based hot-melt adhesives (HMAs) were prepared by mixing 40 wt % of a polymer, namely Affinity 1950GA (metallocene-catalyzed polyethylene) made by Dow Chemical, 20 wt % of wax, namely Sasol C-80 (made by Sasol) and 40 wt % of the hydrocarbon resin of each of Examples and Comparative Examples.

The four materials were placed in a 100 ml beaker and stirred at 180° C. for 1 hr. The parts by weight thereof and the results of evaluation of the properties thereof are shown in Table 8 below.

TABLE 8

|  |  |  | Adhesive D of Ex. 2 | Adhesive D of Ex. 6 | Adhesive D of Ex. 7 | Adhesive D of Ex. 8 | Adhesive D of C. Ex. 4 | Adhesive D of C. Ex. 6 | Adhesive D of C. Ex. 7 | Adhesive D of C. Ex. 9 |
|---|---|---|---|---|---|---|---|---|---|---|
| HMA Formulation (wt %) | HCR | Ex. 2 | 40 |  |  |  |  |  |  |  |
|  |  | Ex. 6 |  | 40 |  |  |  |  |  |  |
|  |  | Ex. 7 |  |  | 40 |  |  |  |  |  |
|  |  | Ex. 8 |  |  |  | 40 |  |  |  |  |
|  |  | C. Ex. 4 |  |  |  |  | 40 |  |  |  |
|  |  | C. Ex. 6 |  |  |  |  |  | 40 |  |  |
|  |  | C. Ex. 7 |  |  |  |  |  |  | 40 |  |
|  |  | C. Ex. 9 |  |  |  |  |  |  |  | 40 |
|  | Polymer | Affinity 1950 GA | 40 | 40 | 40 | 40 | 40 | 40 | 40 | 40 |
|  | Wax | Sasol C-80 | 20 | 20 | 20 | 20 | 20 | 20 | 20 | 20 |
| HMA Properties | Softening Point (° C.) |  | 87.7 | 89 | 89 | 88.9 | 85 | 89.2 | 91 | 89 |
|  | Viscosity (cps) | 160° C. | 1641 | 1750 | 1685 | 1670 | 1258 | 1718 | 1952 | 1718 |
|  |  | 180° C. | 996 | 1120 | 1054 | 1026 | 850 | 1046 | 1125 | 1046 |
| Adhesion properties | Hardness (HAD) |  | 38 | 38 | 38 | 39 | 35 | 32 | 35 | 32 |
|  | Open time (sec) |  | 18 | 18 | 18 | 19 | 13 | 14 | 15 | 16 |
|  | Set time (sec) |  | 0.7 | 0.6 | 0.5 | 0.5 | 1.5 | 0.9 | 1.2 | 1.2 |
| Thermal properties | Gardner color | 180° C. * 24 hours | 7 | 7 | 7 | 7 | 10 | 10 | 9 | 10 |
| Odor intensity |  |  | 1.3 | 1.1 | 1.1 | 1.0 | 3.5 | 3 | 3.3 | 2.1 |

Adhesive E

As adhesives E (HMAs) of Examples 2, 6, 7 and 8 and Comparative Examples 4, 6, 7 and 9, EVA-based HMAs were prepared by mixing 40 wt % of a polymer, namely EVA 28/400 (Ethylene Vinyl Acetate, VA contents 28%, MI 400) made by Arkema, 20 wt % of wax, namely Sasol C-80 (made by Sasol) and 40 wt % of the hydrocarbon resin of each of Examples and Comparative Examples.

The four materials were placed in a 100 ml beaker and stirred at 180° C. for 1 hr. The parts by weight thereof and the results of evaluation of the properties thereof are shown in Table 9 below.

TABLE 9

|  |  |  | Adhesive E of Ex. 2 | Adhesive E of Ex. 6 | Adhesive E of Ex. 7 | Adhesive E of Ex. 8 | Adhesive E of C. Ex. 4 | Adhesive E of C. Ex. 6 | Adhesive E of C. Ex. 7 | Adhesive E of C. Ex. 9 |
|---|---|---|---|---|---|---|---|---|---|---|
| HMA Formulation (wt %) | HCR | Ex. 2 | 40 |  |  |  |  |  |  |  |
|  |  | Ex. 6 |  | 40 |  |  |  |  |  |  |
|  |  | Ex. 7 |  |  | 40 |  |  |  |  |  |
|  |  | Ex. 8 |  |  |  | 40 |  |  |  |  |
|  |  | C. Ex. 4 |  |  |  |  | 40 |  |  |  |
|  |  | C. Ex. 6 |  |  |  |  |  | 40 |  |  |
|  |  | C. Ex. 7 |  |  |  |  |  |  | 40 |  |
|  |  | C. Ex. 9 |  |  |  |  |  |  |  | 40 |
|  | Polymer | EVA (28/400) | 40 | 40 | 40 | 40 | 40 | 40 | 40 | 40 |
|  | Wax | Sasol C-80 | 20 | 20 | 20 | 20 | 20 | 20 | 20 | 20 |
| HMA Properties | Softening Point (° C.) |  | 89.5 | 91.4 | 89 | 88.9 | 87 | 89.2 | 92 | 89 |
|  | Viscosity (cps) | 160° C. | 1250 | 1719 | 1685 | 1685 | 1190 | 1195 | 1684 | 1210 |
|  |  | 180° C. | 688 | 1040 | 958 | 987 | 587 | 589 | 1021 | 595 |
| Adhesion properties |  | Hardness (HAD) | 72 | 74 | 73 | 73 | 72 | 72 | 75 | 75 |
|  |  | Open time (sec) | 16 | 15 | 15 | 17 | 14 | 14 | 14 | 13 |
|  |  | Set time (sec) | 0.5 | 0.6 | 0.8 | 0.9 | 1 | 0.9 | 0.9 | 1.2 |
| Thermal properties | Gardner color | 180° C. * 24 hours | 8 | 7 | 7 | 7 | 9 | 11 | 9 | 9 |
| Odor intensity |  |  | 3.8 | 3.5 | 3.5 | 3.5 | 4.9 | 4.8 | 4.5 | 4.2 |

Adhesive F

As adhesives F (HMAs) of Examples 2, 6, 7 and 8 and Comparative Examples 4, 6, 7 and 9, APAO-based HMAs were prepared by mixing 40 wt % of a polymer, namely Vestoplast 703 (Amorphous propylene-ethylene copolymer) made by Evonik, 20 wt % of wax, namely Sasol C-80 (made by Sasol) and 40 wt % of the hydrocarbon resin of each of Examples and Comparative Examples.

The four materials were placed in a 100 ml beaker and stirred at 180° C. for 1 hr. The parts by weight thereof and the results of evaluation of the properties thereof are shown in Table 10 below.

TABLE 10

|  |  |  | Adhesive F of Ex. 2 | Adhesive F of Ex. 6 | Adhesive F of Ex. 7 | Adhesive F of Ex. 8 | Adhesive F of C. Ex. 4 | Adhesive F of C. Ex. 6 | Adhesive F of C. Ex. 7 | Adhesive F of C. Ex. 9 |
|---|---|---|---|---|---|---|---|---|---|---|
| HMA Formulation (wt %) | HCR | Ex. 2 | 40 |  |  |  |  |  |  |  |
|  |  | Ex. 6 |  | 40 |  |  |  |  |  |  |
|  |  | Ex. 7 |  |  | 40 |  |  |  |  |  |
|  |  | Ex. 8 |  |  |  | 40 |  |  |  |  |
|  |  | C. Ex. 4 |  |  |  |  | 40 |  |  |  |
|  |  | C. Ex. 6 |  |  |  |  |  | 40 |  |  |
|  |  | C. Ex. 7 |  |  |  |  |  |  | 40 |  |
|  |  | C. Ex. 9 |  |  |  |  |  |  |  | 40 |
|  | Polymer | Vestoplast 703 | 40 | 40 | 40 | 40 | 40 | 40 | 40 | 40 |
|  | Wax | Sasol C-80 | 20 | 20 | 20 | 20 | 20 | 20 | 20 | 20 |
| HMA Properties | Softening Point (° C.) |  | 99 | 100 | 99 | 100 | 99 | 99 | 101 | 99 |
|  | Melt Viscosity (cps) | 160° C. | 525 | 521 | 525 | 579 | 495 | 512 | 605 | 511 |
|  |  | 180° C. | 310 | 352 | 325 | 364 | 284 | 305 | 351 | 302 |
| Adhesion properties |  | Hardness (HAD) | 38 | 41 | 40 | 39 | 35 | 32 | 34 | 32 |

TABLE 10-continued

|  |  |  | Adhesive F of Ex. 2 | Adhesive F of Ex. 6 | Adhesive F of Ex. 7 | Adhesive F of Ex. 8 | Adhesive F of C. Ex. 4 | Adhesive F of C. Ex. 6 | Adhesive F of C. Ex. 7 | Adhesive F of C. Ex. 9 |
|---|---|---|---|---|---|---|---|---|---|---|
|  |  | Open time (sec) | 16 | 18 | 17 | 18 | 12 | 12 | 12 | 13 |
|  |  | Set time (sec) | 0.8 | 0.8 | 0.8 | 0.9 | 1 | 0.9 | 0.9 | 1.2 |
| Thermal properties | Gardner color | 180° C. * 24 hours | 7 | 7 | 7 | 7 | 8 | 11 | 9 | 11 |
| Odor intensity |  |  | 2.5 | 2.8 | 2.7 | 2.9 | 4.0 | 4.1 | 4.0 | 3.5 |

Through the adhesives A to F, the adhesive of the present invention exhibited increased adhesion, reduced odor, and improved heat resistance.

Although specific embodiments of the present invention have been disclosed in detail as described above, it will be obvious to those skilled in the art that such description is merely of preferable exemplary embodiments and is not to be construed to limit the scope of the present invention. Therefore, the substantial scope of the present invention will be defined by the appended claims and equivalents thereof.

The invention claimed is:

1. A method of preparing a hydrocarbon resin, comprising:
    (S1) preparing a polymer through thermal polymerization of a dicyclopentadiene and a C6-C20 olefin mixed together in a solvent; and
    (S2) hydrogenating the polymer of S1 using a hydrogenation catalyst,
    wherein an amount of the solvent is greater than an amount of dicyclopentadiene,
    wherein the olefin in S1 is a linear alpha-olefin (LAO),
    wherein the hydrocarbon resin comprises a repeating unit represented by Chemical Formula 1 and a repeating unit represented by Chemical Formula 2,
    wherein Formula 1 is

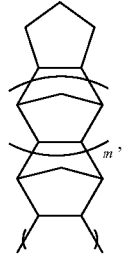

wherein Formula 2 is

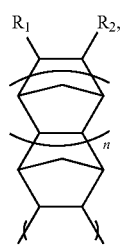

wherein $R_1$ is hydrogen or a methyl group, $R_2$ is a $C_4$-$C_{18}$ alkyl group when $R_1$ is hydrogen, and $R_2$ is a $C_3$-$C_{17}$ alkyl group when $R_1$ is a methyl group, and m and n are each an integer of 0 to 10,
    wherein the hydrocarbon resin includes 10 to 40 mol % of an olefin-derived component, and
    wherein a ratio of a peak area of 5.9 ppm to 6.0 ppm to a peak area of 5.6 ppm to 5.9 ppm of the polymer in $^1$H-NMR spectrum is 0.14 to 0.27.

2. The method of claim 1, wherein the olefin in S1 is added in an amount of 0.1 to 2.0 mol relative to 1 mol of the dicyclopentadiene.

3. The method of claim 1, wherein the thermal polymerization in S1 is performed at 200-320° C. for 0.5 to 4 hr.

4. The method of claim 1, wherein the hydrogenation catalyst in S2 is at least one selected from the group consisting of nickel, palladium, cobalt, platinum and rhodium catalysts.

5. The method of claim 1, wherein the hydrogenation catalyst in S2 is added in an amount of 0.001 to 0.5 mol relative to 1 mol of the dicyclopentadiene.

6. The method of claim 1, wherein the hydrogenating in S2 is performed at a pressure of 50 to 150 bar and a temperature of 150 to 300° C.

7. A hydrocarbon resin, comprising a repeating unit represented by Chemical Formula 1 and a repeating unit represented by Chemical Formula 2,
    wherein Formula 1 is

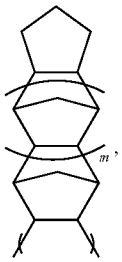

wherein Formula 2 is

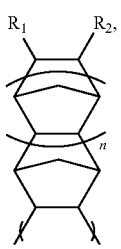

wherein $R_1$ is hydrogen or a methyl group, $R_2$ is a $C_4$-$C_{18}$ alkyl group when $R_1$ is hydrogen, and $R_2$ is a $C_3$-$C_{17}$ alkyl group when $R_1$ is a methyl group, and m and n are each an integer of 0 to 10, wherein the hydrocarbon resin includes 10 to 40 mol % of an olefin-derived component, and wherein the hydrocarbon resin is prepared by hydrogenating a polymer, wherein a ratio of a peak area of 5.9 ppm to 6.0 ppm to a peak area of 5.6 ppm to 5.9 ppm of the polymer in $^1$H-NMR spectrum is 0.14 to 0.27.

8. The hydrocarbon resin of claim 7, wherein the hydrocarbon resin has a weight average molecular weight of 500 to 3000 g/mol, a softening point of 10 to 150° C., and a color scale (APHA color) of 1 to 100.

9. The hydrocarbon resin of claim 8, wherein the hydrocarbon resin has a peak area ratio S1 of 20% or more and a peak area ratio S2 of 50% or more, based on spectrum results after $^1$H-NMR measurement, as determined by Equations 1 and 2, wherein $S1=A1/A3$, wherein $S2=A2/A3$, and wherein A1 is a peak area of 0.8 to 1.0 ppm, A2 is a peak area of 1.0 to 1.4 ppm, and A3 is a peak area of 1.4 to 7.5 ppm, based on the spectrum results after $^1$H-NMR measurement of the hydrocarbon resin.

10. An adhesive composition, comprising:
a hydrocarbon resin including a repeating unit represented by Chemical Formula 1 and a repeating unit represented by Chemical Formula 2;
at least one polymer selected from the group consisting of a styrenic block copolymer, polyethylene, polypropylene, ethylene vinyl acetate, and an ethylene-based polyolefin block copolymer; and
at least one oil selected from the group consisting of synthetic wax, animal natural wax, vegetable natural wax, aromatic oil, naphthenic oil, and paraffinic oil, wherein Formula 1 is

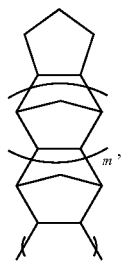

wherein Formula 2 is

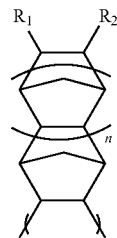

and wherein $R_1$ is hydrogen or a methyl group, $R_2$ is a $C_3$-$C_{18}$ alkyl group, and m and n are each an integer of 0 to 10.

11. The adhesive composition of claim 10, wherein the adhesive composition has a softening point of 50 to 150° C. and a melt viscosity of 300 to 10,000 cps at 160° C. and 200 to 8,000 cps at 180° C.

* * * * *